(12) United States Patent
Zuzelo

(10) Patent No.: US 8,146,475 B1
(45) Date of Patent: *Apr. 3, 2012

(54) SYSTEM AND METHOD FOR FORMING SHAPED GROOVES IN AN AIRPORT RUNWAY

(76) Inventor: Edward A. Zuzelo, Conshohocken, PA (US)

(*) Notice: Subject to any disclaimer, the term of this patent is extended or adjusted under 35 U.S.C. 154(b) by 449 days.

This patent is subject to a terminal disclaimer.

(21) Appl. No.: 12/339,120

(22) Filed: Dec. 19, 2008

Related U.S. Application Data

(63) Continuation-in-part of application No. 11/906,335, filed on Oct. 2, 2007, now Pat. No. 7,832,321.

(51) Int. Cl.
*B27B 33/02* (2006.01)
(52) U.S. Cl. .......................................... 83/855; 407/60
(58) Field of Classification Search ............ 83/853–855; 407/60–62; 125/15; 451/548; 299/39.3
See application file for complete search history.

(56) References Cited

U.S. PATENT DOCUMENTS

| 4,267,814 A | 5/1981 | Benson |
| 5,311,705 A * | 5/1994 | Zuzelo ........................... 451/540 |
| 7,832,321 B1 * | 11/2010 | Zuzelo ........................... 83/855 |

OTHER PUBLICATIONS

"Friction Effects of Runway Grooves, Runway 4R-22L, John F. Kennedy International Airport", Defense Technical Information Center Report AD0692075.

* cited by examiner

*Primary Examiner* — Sunil Singh
(74) *Attorney, Agent, or Firm* — LaMorte & Associates, P.C.

(57) ABSTRACT

A method of cutting grooves having a trapezoidal profile into an airport runway. Each of the grooves has a base of a first width, an open top of a second width and sloped sidewalls. The grooves are cut by the single pass of a rotating blade. The blade used to cut the trapezoidal shaped grooves has a plurality of cutting teeth. Each of the cutting teeth has a wide body section, a face surface, a bottom surface and side surfaces that extend from the face surface to the wide body section. The wide body section has a width equal to the maximum width of the groove being cut. However, the face surface has a width equal to the minimum width of the groove being cut. The result is a cutting tooth that cuts smoothly and maintains its trapezoidal shape as it wears.

14 Claims, 4 Drawing Sheets

US 8,146,475 B1

SYSTEM AND METHOD FOR FORMING SHAPED GROOVES IN AN AIRPORT RUNWAY

RELATED APPLICATIONS

This patent application is a continuation-in-part of U.S. patent application Ser. No. 11/906,335, filed Oct. 2, 2007 now U.S. Pat. No. 7,832,321 and entitled Cutting Blade For Producing A Trapezoidal Groove In Pavement And Its Associated Method Of Manufacture.

BACKGROUND OF THE INVENTION

1. Field of the Invention

In general, the present invention relates to the structure of airport runways. More particularly, the present invention relates to the methods used to create grooving patterns in airport runways.

2. Prior Art Description

Most all paved surfaces are impervious to water. Consequently, any low-point or depression in a paved surface has the potential to cause puddling during a rain storm. Furthermore, if the rate of precipitation excesses the rate at which water can flow off the payment, puddling will inevitably occur. If the paved surface is an airport runway, such puddling can be extremely dangerous. If the wheels of an airplane roll through a puddle during takeoff or landing, the wheels of the airplane can hydroplane. This can cause the airplane to turn on the runway and/or prevent an airplane from stopping or reaching takeoff speeds prior to the end of a runway.

It is for these reasons that many airports cut grooves into the surfaces of the paved runways. According to the U.S. Federal Aviation Administration (FAA), runway grooves should be ¼ inch wide, ¼ inch deep and should be spaced one and a half inches apart. In theory, the grooves provide flow channels for water. Any water on the runway should flow into the grooves and should then flow to the sides of the runway. Furthermore, even if some puddling does occur, the grooves provide room for the water to flow as the wheels of the airplane pass. Consequently, hydroplaning can be avoided.

Traditionally, grooves are cut into the pavement of a runway using a standard diamond embossed cutting blade. The cutting teeth on the blade have a uniform thickness. Consequently, when the blade cuts into the pavement, it produces a groove that has a square or rectangular cross-sectional profile.

Grooves with rectangular cross-sectional profiles are not without disadvantages. Grooves of such a configuration have right-angle top edges where the pavement encounters the cut groove. These sharp edges cause wear to airplane tires as the treads of the tire touch down upon the runway. Likewise, the sharp top edges tend to chip and wear when contacted by airplane wheels, snowplows and other vehicles. Furthermore, due to freeze-thaw cycles and other weathering, the sharp top edges chip and fall away. The chipped material typically falls into the bottom of the groove. This creates small obstructions in the grooves. These small obstructions become a natural catch point for dirt, tire rubber and other debris. Soon, the groove is clogged and cannot effectively channel water. The grooving then becomes an ineffective water channeling device and dangerous puddling can occur.

In the prior art, attempts have been made to produce grooves that do not have rectangular cross-sectional profiles. If a groove can be made with sloped sides, then the sharp top edge can be eliminated. This would cause less wear, less debris and would, therefore, reduce the need for maintenance.

In the prior art, experiments have been conducted on airport runways that have been grooved with V-shaped grooves. A description of such a runway grooving configuration is found in U.S. Pat. No. 5,311,705 to Zuzelo, entitled Contoured Cutting Tool, and in Defense Technical Information Center report AD0692075, entitled Friction Effects Of Runway Grooves, Runway 4R-22L, John F. Kennedy International Airport. Although V-shaped grooves do wear and weather better than rectangular-shaped grooves, they have other disadvantages. Primary among those disadvantages is that a V-shaped groove does not channel water as efficiently as does a rectangular-shaped groove. Accordingly, in order to achieve the same degree of water removal from a runway, either more V-shaped grooves must be cut or deeper V-shaped grooves must be cut. This significantly increases the cost of grooving a runway.

To create a V-shaped groove, a blade is used having teeth with a triangular profile. Such blades do initially create a groove in pavement that is V-shaped. However, the V-shape of the cutting teeth causes the cutting teeth to wear unevenly. Consequently, after a short time, the shape of the groove being cut changes and eventually returns to a rectangular shape. The cutting blades must therefore be replaced very often during cutting. Since the blades contain diamond dust and are very expensive, the cost of cutting non-rectangular grooves soon becomes cost prohibitive.

In order to avoid many of the stated disadvantages of both rectangular grooves and V-shaped grooves, a trapezoidal groove may be produced in a runway. A trapezoidal groove is a groove with a flat bottom and sloped sidewalls. Trapezoidal grooves channel water more efficiently than do rectangular grooves and V-shaped groves. Accordingly, less trapezoidal grooves are needed to move the same amount of water. Accordingly, a lower density of trapezoidal grooves is required. Less trapezoidal grooves results in lower production cost and less maintenance.

The problem with trapezoidal grooving is it previously could not be made in an economically practical fashion. In the prior art, blades have been created that have cutting teeth with trapezoidal shaped profiles. However, when such blades are used to cut concrete, the sides of the cutting teeth quickly wear. Thus, after cutting only a short distance, the groove changes shape and the cutting blade must be replaced.

In U.S. Pat. No. 4,267,814 to Benson, entitled Abrasive Saw Blade For Trapezoidal Grooving, an attempt is made to create a blade that cuts trapezoidal grooves and lasts longer than a traditional blade. In the Benson patent, a blade is made with cutting teeth of alternating shapes. Every other cutting tooth has a standard rectangular-shaped profile. Interposed between the standard cutting teeth are cutting teeth with a trapezoidal-shaped profile. However, the trapezoidal-shaped teeth are wider than the rectangular teeth. As a consequence, the trapezoidal teeth do not fit into the groove cut by the rectangular teeth. The result is that the trapezoidal teeth impact the edges of the groove made by the rectangular teeth. This produces chipping in the walls of the groove and excessive wear in the trapezoidal teeth. Consequently, the blade wears out at least as quickly as blades with all trapezoidal teeth.

A need therefore exists for a runway grooving system and method that wears better than traditional grooving, channels a greater amount of water than traditional grooving, requires less maintenance than traditional grooving and can be made as inexpensively as traditional grooving. This need is met by the present invention as described and claimed below.

SUMMARY OF THE INVENTION

The present invention is a method of cutting grooves having a trapezoidal profile into an airport runway at a predetermined depth. Each of the grooves has a base of a first width, an open top of a wider second width and sloped sidewalls that extend from the open top to a bottom surface. The grooves are cut by the single pass of a rotating blade.

The blade used to cut the trapezoidal shaped grooves has a plurality of cutting teeth. Each of the cutting teeth has a wide body section, a face surface, a bottom surface and side surfaces that extend from the face surface to the wide body section. The wide body section has a width equal to the maximum width of the groove being cut. However, the face surface has a width equal to the minimum width of the groove being cut. The result is a cutting tooth that cuts smoothly and maintains its trapezoidal shape as it wears.

Utilizing the blade, a plurality of parallel grooves are cut into a surface of an airport runway. The trapezoidal grooves carry more water than do traditional rectangular grooves. Accordingly, less grooves need to be cut. This results in lower production costs and lower maintenance costs.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
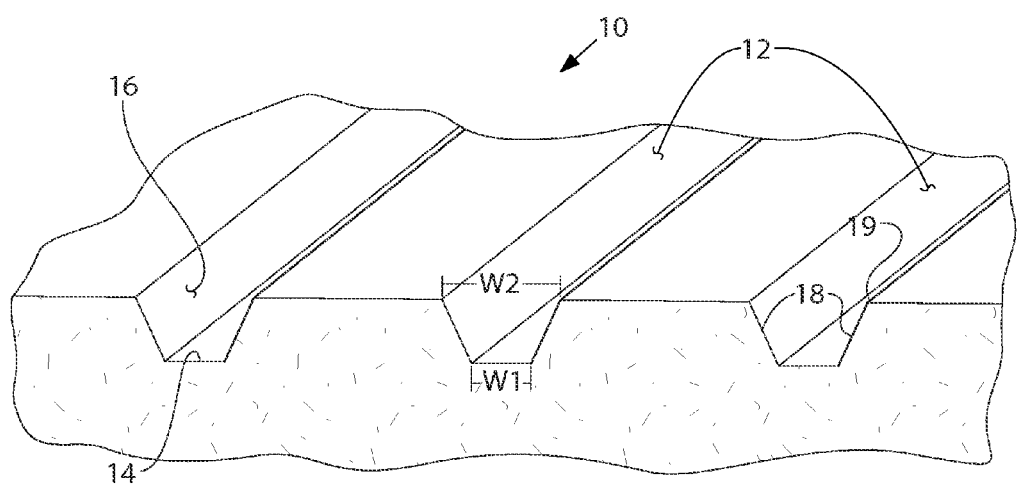
FIG. 1 is a fragmented perspective view of a section of airport runway containing trapezoidal grooves.

Referring to FIG. 1, a segment of airport runway 10 is shown. The runway 10 is grooved with a plurality of parallel grooves 12. The grooves 12 extend laterally across the runway perpendicular to the direction of an airplane landing or taking off.

Each groove 12 has a generally trapezoidal-shaped profile. Each groove 12 has a flat base 14, an open top 16 and two sloped sidewalls 18 that diverge from the flat base 14 to the open top 16.

The flat base 14 of the groove 12 has a width W1. The width W1 of the flat base 14 is in a range between six millimeters and thirteen millimeters. The preferred width of the flat base is 6.25 millimeters or about ¼ inch wide. The open top 16 of each groove 12 has a width W2. The width W2 of the open top 16 of the groove 12 is 150% to 250% larger than the width W2 of the flat base 14. Accordingly, the width W2 of the open top 16 is between nine millimeters and thirty millimeters.

The trapezoidal grooves 12 provide an equal or better coefficient of friction in comparison to traditional rectangular grooves. Furthermore, other advantages are realized. Because of the oblique angles of the sidewalls 18, the top edge 19 of each groove 12 is less salient. Accordingly, when an airplane tire contacts the top edge 19, it is less likely that either the airplane tire or the top edge 19 will experience wear. This results in less tire rubber buildup in the runway. Consequently, there is a lower need for maintenance and less of a need for rubber dissolving chemicals.

In addition to less rubber build-up, there is also less chipping and wear along the top edge 19 of the groove 12. Less wear results in less wear debris and a lower chance that collecting debris will clog any of the grooves 12.

One of the largest benefits obtained by using trapezoidal-shaped grooves 12 is that the trapezoidal grooves 12 can channel away 85% more water than traditional rectangular grooves. This means that grooving can be made less dense and yet channel the same amount of water.

Figure 2:
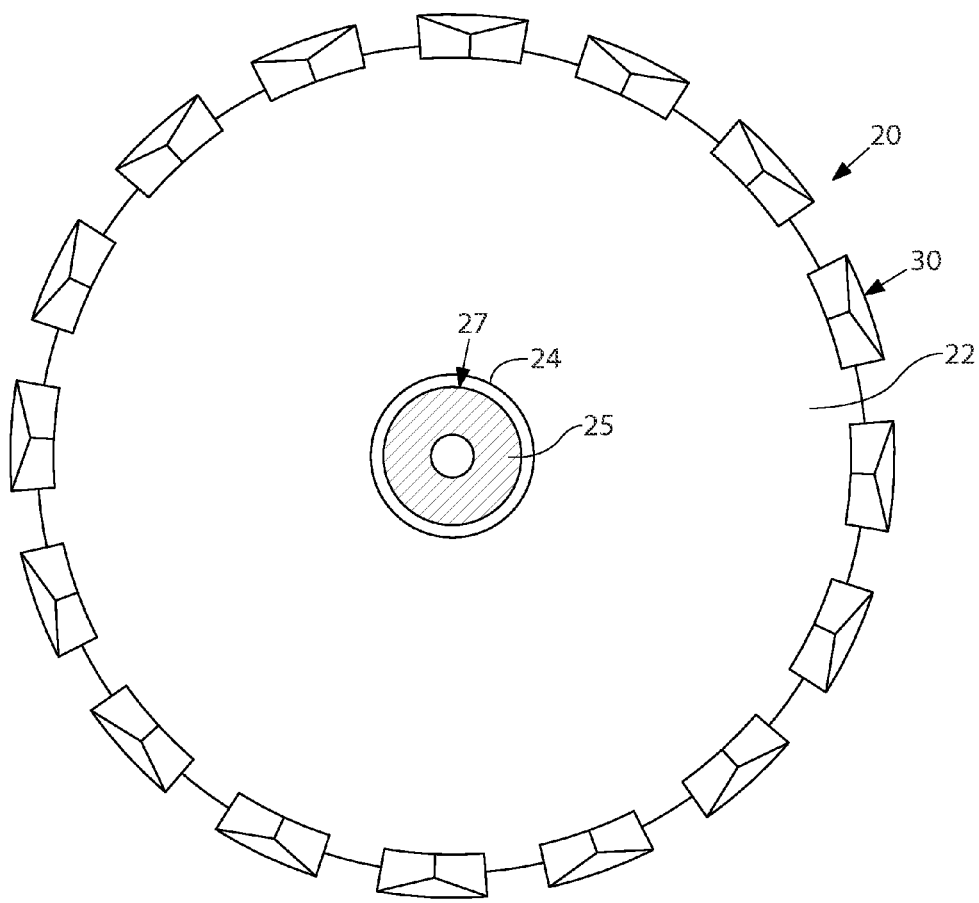
FIG. 2 shows an exemplary embodiment of a blade mounted on the cross-sectioned arbor of a pavement cutting machine.

Referring to FIG. 2, an exemplary blade assembly 20 is shown that can be used to produce the grooves 12 of FIG. 1. The blade assembly 20 has a circular metal blank 22 with an arbor hole 24 positioned in its center. The arbor hole 24 is shaped and sized to enable the blade assembly 20 to be attached to the mounting arbor 25 of a pavement cutting machine 27.

A plurality of cutting teeth 30 are symmetrically disposed around the circular metal blank 22. Each of the cutting teeth 30 is identical in shape, size and construction. The cutting teeth 30 are evenly distributed around the circular metal blank 22 so that the blade assembly 20 remains balanced, even at high rotating speeds.

Figure 3:
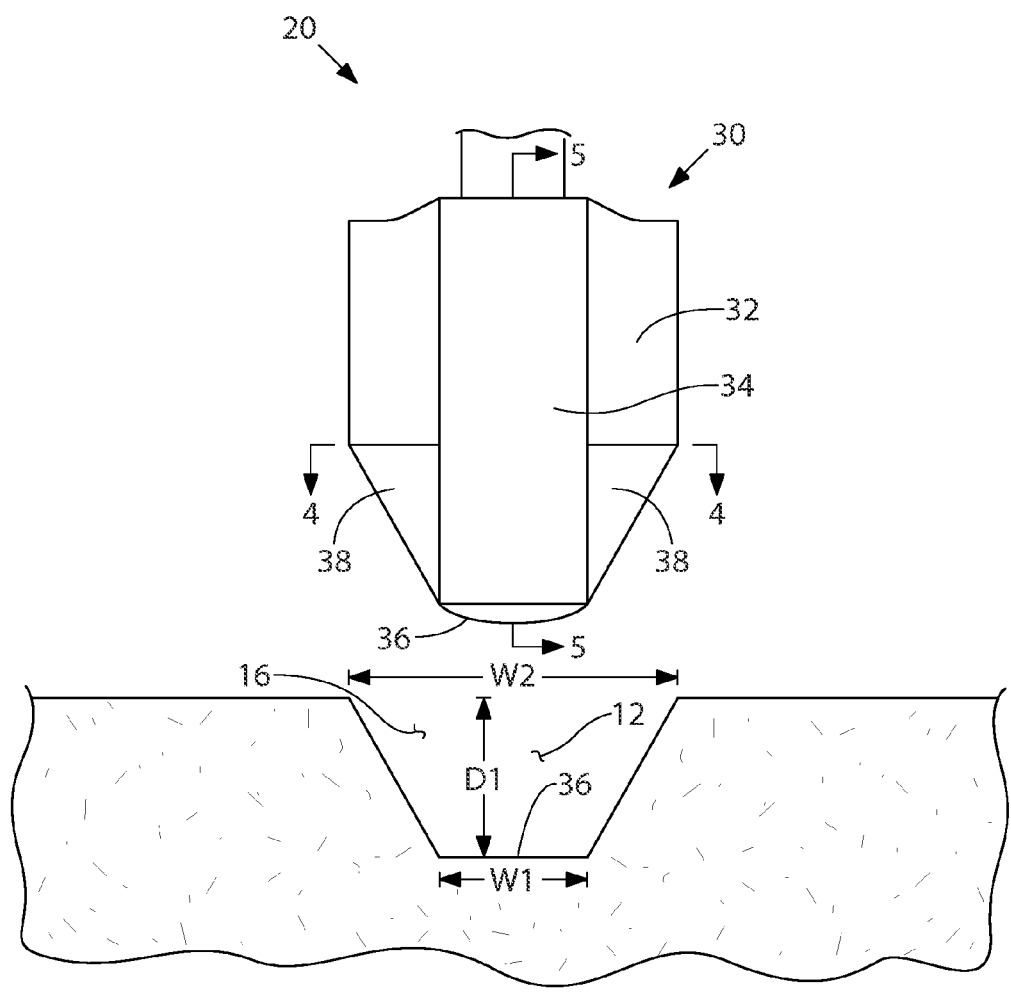
FIG. 3 shows an end view of a cutting tooth on a blade and a groove in an airport runway cut by the blade.
Figure 4:
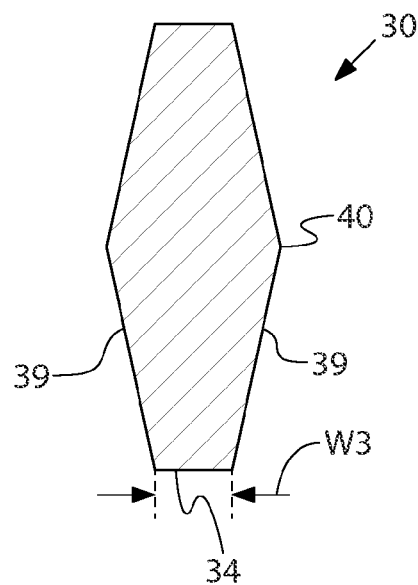
FIG. 4 shows a cross-sectional view of the cutting tooth shown in FIG. 3, vied along section line 4-4.
Figure 5:
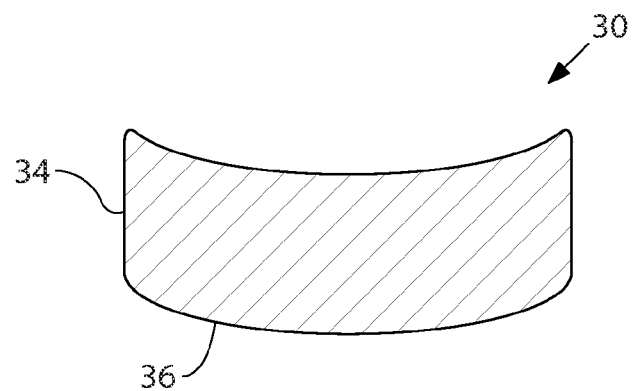
FIG. 5 shows a cross-sectional view of the cutting tooth shown in FIG. 3, vied along section line 5-5.

Referring to FIG. 3 in conjunction with both FIG. 4 and FIG. 5, it can be seen that each cutting tooth 30 has a complex shape. The shape of each cutting tooth 30 varies along both its height and length. The purpose of the complex shape of each cutting tooth 30 is to ensure that the cutting tooth 30 cuts the desired trapezoidal shaped groove 12 as the cutting tooth 30 continues to wear away.

Each cutting tooth 30 has a body 32 of diamond impregnated and/or diamond coated material. The body 32 of each cutting tooth 30 has a face surface 34 and a bottom surface 36. When the blade assembly 20 is moving in its operational direction of rotation, the face surface 34 of the cutting tooth 30 faces the direction of rotation. Consequently, the face surface 34 of each cutting tooth 30 is the first portion of the cutting tooth 30 to contact the pavement being cut. The face surface 34 has a width W3 that is equal to the desired width W1 of the base 14 of the groove 12 being cut.

The face surface 34 intersects the bottom surface 36 at an angle just slightly greater than perpendicular. The bottom surface 36 of the cutting tooth 30 is curved, wherein the curvature of the bottom surface 36 is concentric with the curvature of the circular metal blank 22. The bottom surface 36 is the surface of the cutting tooth 30 that lay the farthest from the center of the circular metal blank 22. The bottom surface 36 also has a width that is equal to the desired width W1 at the base 14 of the groove 12 being cut.

Each cutting tooth 30 has a wide section 40. The wide section 40 has maximum width that is equal to the width W2 of the open top 16 of the groove 12 being cut. Since each cutting tooth 30 has a wide section 40 that is wider than the face surface 34 and the bottom surface 36, the body 32 of each cutting tooth 30 tapers in two planes. Each cutting tooth 30 expands in a vertical plane (FIG. 3) from the width of the bottom surface 36 to the wide section 40. This expansion is defined by two angled side planes 38 that diverge away from the bottom surface 36.

Likewise, in the horizontal plane (FIG. 4) each cutting tooth 30 expands from the width of the face surface 34 to the wide section 40. This expansion is defined by two angled side planes 39 that diverge away from the face surface 34. The contoured side panels 38, 39 of each cutting tooth 30 are configured to wear in a manner that maintains the selected shape of the groove 12 as the cutting tooth 30 wears away. In this manner, although the cutting tooth 30 does wear, the wear is evenly distributed and the cross-sectional shape of the groove 12 being cut does not significantly change.

In the selected embodiment of the cutting tooth 30, the groove 12 that is created has a trapezoidal cross-section. It will be understood that other shapes can be created by varying the surfaces of the cutting tooth 30. For example, the sidewalls 18 of the groove 12 and/or the base 14 of the groove 12 can be made to be curved. Furthermore, the angle of the sidewalls 18 can be varied to any acute angle. All such variations, modifications and alternate embodiments are intended to be included within the scope of the present invention as defined by the claims.

What is claimed is:

1. A method of cutting grooves having a trapezoidal profile into an airport runway at a predetermined depth, wherein each of said grooves has a base of a first width, an open top of a wider second width and sloped side walls that extend from said open top to said base, said method comprising the steps of:

providing a saw blade having circular blank with a plurality of cutting teeth mounted thereon, each of said cutting teeth having a body with a face surface at one end of said body, a bottom surface that runs along said body furthest from said circular blank, a wide section disposed behind said face surface and above said bottom surface and side surfaces that extend from said face surface to said wide section, wherein said wide section has a width equal to said second width and both said face surface and said bottom surface have a width equal to said first width; and cutting a plurality of grooves in a surface of an airport runway utilizing said saw blade.

2. The method according to claim 1, wherein said step of cutting a plurality of grooves includes cutting said grooves with a spacing between adjacent grooves of between two inches and six inches.

3. The method according to claim 1, wherein said saw blade is a circular saw blade and said method further includes mounting said saw blade to a pavement cutting saw.

4. The method according to claim 1, wherein said bottom surface is curved.

5. A method of grooving an airport runway with grooves that have a trapezoidal shaped profile, comprising the steps of:

providing a rotating blade having a plurality of cutting teeth that move in a direction of rotation, each of said cutting teeth has a body with a face surface, a bottom surface and a wide section disposed behind said face surface and above said bottom surface, wherein said face surface and said bottom surface have a constant first width, and wherein said wide section has a wider second width, wherein said body expands from said face surface to said wide section along said direction of rotation; and cutting a plurality of grooves in a surface of an airport runway utilizing said rotating blade.

6. The method according to claim 5, wherein said step of cutting a plurality of grooves includes cutting a plurality of parallel grooves.

7. The method according to claim 6, wherein said step of cutting a plurality of grooves includes cutting said grooves with a spacing between adjacent grooves of between two inches and six inches.

8. The method according to claim 5, wherein said wide section is disposed a first distance away from said bottom surface.

9. The method according to claim 8, wherein said bottom surface has a width that is equal to said face surface.

10. The method according to claim 9, wherein said bottom surface is curved.

11. A method of grooving an airport runway, comprising the steps of:

providing a rotating blade having a plurality of cutting teeth extending from a circular blank, wherein each of said cutting teeth has a face surface, a bottom surface and a wide section disposed behind said face surface and above said bottom surface, wherein said face surface and said bottom surface have a constant first width, and wherein said wide section has a second width that is wider than said first width, wherein each of said cutting teeth has angled surfaces that extends from said face surface and said bottom surface to said wide section; and cutting a plurality of grooves in a surface of an airport runway utilizing said rotating blade, wherein each of said grooves has a trapezoidal profile.

12. The method according to claim 11, wherein said step of cutting a plurality of grooves includes cutting a plurality of parallel grooves.

13. The method according to claim 12, wherein said step of cutting a plurality of grooves includes cutting said grooves with a spacing between adjacent grooves of between two inches and six inches.

14. The method according to claim 11, wherein said bottom surface is curved.

\* \* \* \* \*